(12) United States Patent
Lewis

(10) Patent No.: US 12,382,940 B1
(45) Date of Patent: Aug. 12, 2025

(54) FISHING LURE

(71) Applicant: Delbert Lewis, Ozark, MO (US)

(72) Inventor: Delbert Lewis, Ozark, MO (US)

( * ) Notice: Subject to any disclaimer, the term of this patent is extended or adjusted under 35 U.S.C. 154(b) by 172 days.

(21) Appl. No.: 17/443,176

(22) Filed: Jul. 21, 2021

(51) Int. Cl.
A01K 85/00 (2006.01)

(52) U.S. Cl.
CPC ...... *A01K 85/1833* (2022.02); *A01K 85/1803* (2022.02)

(58) Field of Classification Search
CPC ............ A01K 85/1833; A01K 85/1803; A01K 85/00; A01K 85/005; A01K 85/01; A01K 85/02; A01K 85/08; A01K 85/10; A01K 85/12; A01K 85/14; A01K 85/16; A01K 85/18
USPC ......................................................... 43/42.5
See application file for complete search history.

(56) References Cited

U.S. PATENT DOCUMENTS

| | | | | |
|---|---|---|---|---|
| 1,700,061 A * | 1/1929 | Kimmich | ................ | A01K 85/16 43/42.47 |
| 2,005,554 A * | 6/1935 | Milner | .................... | A01K 85/16 43/42.34 |
| 2,281,578 A * | 5/1942 | Heddon | ................. | A01K 85/00 43/42.35 |
| 2,945,318 A * | 7/1960 | Lassiter | ................. | A01K 85/16 43/42.49 |
| 3,138,892 A * | 6/1964 | Hall | ........................ | A01K 85/00 43/43.12 |
| 3,187,457 A * | 6/1965 | Karisch | ................... | A01K 85/00 43/42.22 |
| 3,191,336 A * | 6/1965 | Cordell, Jr. | ............ | A01K 85/00 D22/128 |
| 3,750,321 A * | 8/1973 | McClellan | ............. | A01K 85/00 43/42.32 |

(Continued)

FOREIGN PATENT DOCUMENTS

| | | | |
|---|---|---|---|
| JP | 2003333959 A | * | 11/2003 |
| KR | 20180059971 A | * | 6/2018 |

(Continued)

OTHER PUBLICATIONS

Sills, Joe. "Crankbaits—Which Are the Best?" MidSouth Hunting Fishing News, Jan. 16, 2020, mshfn.com/crankbaits-which-are-the-best/. (Year: 2020).*

(Continued)

*Primary Examiner* — Peter M Poon
*Assistant Examiner* — Angelica Alejandra Almeida Bonnin
(74) *Attorney, Agent, or Firm* — AVEK IP, LLC; Jacob Chappell

(57) ABSTRACT

A fishing lure includes a lure body, an anchor point, a hook, and a guide. The lure body has opposed forward and rearward areas, an upper area, and a lower area. The anchor point extends upwardly from the upper area of the lure body in a direction away from the rearward area of the lure body. The hook has a shank fixedly extending from the rearward area of the lure body, and the hook has a tip located above the lure body. The guide extends from the forward area of the lure body. The guide has a steering portion angled downwardly away from the anchor point, and the steering portion extends downwardly below the lure body. The steering portion of the guide includes a leading edge and is generally symmetrical, and a maximum width of the guide is greater than a maximum width of the lure body.

19 Claims, 6 Drawing Sheets

(56) References Cited

U.S. PATENT DOCUMENTS

| | | | | |
|---|---|---|---|---|
| 3,855,722 | A * | 12/1974 | Moore | A01K 85/00 43/42.34 |
| 4,641,455 | A * | 2/1987 | Johnson | A01K 85/01 43/42.31 |
| 4,739,576 | A * | 4/1988 | Davis | A01K 85/16 43/42.47 |
| 4,777,758 | A * | 10/1988 | Phillips | A01K 85/02 43/43.2 |
| 4,815,229 | A * | 3/1989 | Nicholson, III | A01K 85/16 43/42.47 |
| 4,862,629 | A * | 9/1989 | Ryan | A01K 85/00 43/42.47 |
| 4,888,909 | A * | 12/1989 | Adams | A01K 85/10 43/42.39 |
| 5,216,830 | A * | 6/1993 | Brott, II | A01K 85/00 43/42.39 |
| 5,551,185 | A * | 9/1996 | Reed | A01K 85/00 43/42.31 |
| 5,566,498 | A * | 10/1996 | Itoh | A01K 85/16 43/42.31 |
| 6,484,434 | B1 * | 11/2002 | Elges | A01K 85/16 43/42.47 |
| 6,718,684 | B2 * | 4/2004 | Yong-Set | A01K 85/16 43/42.39 |
| 6,772,553 | B2 * | 8/2004 | Phillips | A01K 85/02 43/44.8 |
| 8,196,337 | B2 * | 6/2012 | Simmons | A01K 85/00 43/42.32 |
| 8,429,847 | B2 * | 4/2013 | Ford | A01K 85/16 43/42.22 |
| 8,869,446 | B2 * | 10/2014 | Parks | A01K 85/02 43/42.4 |
| 8,919,032 | B1 * | 12/2014 | Paino | A01K 85/00 43/42.1 |
| 10,492,478 | B1 * | 12/2019 | Parks | A01K 85/00 |
| 11,317,612 | B2 * | 5/2022 | Olson | A01K 85/10 |
| 2007/0199234 | A1 * | 8/2007 | Davis | A01K 85/00 43/42.15 |
| 2008/0127541 | A1 * | 6/2008 | Shelton | A01K 85/00 43/42.13 |
| 2011/0214333 | A1 * | 9/2011 | Travieso | A01K 85/00 43/42.39 |
| 2013/0180159 | A1 * | 7/2013 | Smith | A01K 85/00 43/4.5 |
| 2016/0183504 | A1 * | 6/2016 | Curtis | A01K 85/10 43/4.5 |
| 2016/0270379 | A1 * | 9/2016 | Perez | A01K 85/00 |
| 2022/0394963 | A1 * | 12/2022 | Yukitomo | A01K 85/16 |

FOREIGN PATENT DOCUMENTS

| | | | | |
|---|---|---|---|---|
| WO | WO-2017137557 | A1 * | 8/2017 | A01K 85/00 |
| WO | WO-2021161507 | A1 * | 8/2021 | A01K 85/00 |
| WO | WO-2022011389 | A1 * | 1/2022 | |

OTHER PUBLICATIONS

The Custom Fisherman. "Top 10 Crankbait Design Elements for Tackle Makers." The Custom Fisherman, Mar. 8, 2016, www.thecustomfisherman.com/top-10-crankbait-design-elements-tackle-makers/. (Year: 2016).*

"Testing Different CrankBait Lip Shapes." YouTube, uploaded by Marling Baits, Sep. 11, 2019, https://www.youtube.com/watch?v=5Gldh2ux9HM (Year: 2019).*

"Trapezoid." Merriam-Webster.com Dictionary, Merriam-Webster, https://www.merriam-webster.com/dictionary/trapezoid. Accessed Jun. 14, 2024 (Year: 2024).*

"Symmetrical." Merriam-Webster.com Dictionary, Merriam-Webster, https://www.merriam-webster.com/dictionary/symmetrical. Accessed Jun. 14, 2024 (Year: 2024).*

* cited by examiner

FISHING LURE

FIELD OF THE INVENTION

The disclosure relates generally to fishing lures. More specifically, the disclosure relates to fishing lures for use at the floor of a body of water.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

According to an embodiment, a fishing lure includes a lure body, a hook, an anchor point, and a guide. The lure body has opposed forward and rearward areas, an upper area that terminates at a top, and a lower area that terminates at a bottom. The hook has a shank fixedly extending from the rearward area of the lure body, a bend extending away from the bottom of the lure body, and a point. A first orientation plane extends along the shank and the lure body, and the first orientation plane separates the upper area of the lure body from the lower area of the lure body. A second orientation plane is perpendicular to the first orientation plane and extends along the shank and the lure body. The anchor point extends from the upper area of the lure body in a direction away from the first orientation plane and away from the rearward area of the lure body for attaching fishing line to the lure body along the second orientation plane. The guide has a steering portion and an attachment portion. The steering portion is angled relative to the attachment portion in a direction away from the anchor point. The attachment portion couples the steering portion to the lure body such that the steering portion extends away from the hook and away from the lure body top. The steering portion extends beyond the bottom of the lure body relative to the first orientation plane.

According to another embodiment, a fishing lure includes a lure body, an anchor point, a hook, and a guide. The lure body has opposed forward and rearward areas, an upper area, and a lower area. The anchor point extends upwardly from the upper area of the lure body in a direction away from the rearward area of the lure body. The hook extends from the rearward area of the lure body. The hook has a point located above the lure body and aligned with the anchor point. The guide extends from the forward area of the lure body and has a steering portion angled downwardly away from the anchor point. The steering portion extends downwardly beyond the lower area of the lure body. The steering portion of the guide includes a first lateral edge extending away from the lure body to a first point, a second lateral edge extending away from the lure body to a second point, a leading edge, a first tapered edge extending from the first point to the leading edge, and a second tapered edge extending from the second point to the leading edge. A leading zone of the guide extends from the leading edge to an imaginary line connecting the first and second points, and the leading zone is generally trapezoidal. A maximum width of the guide is a distance between the first and second points, and the maximum width of the guide is greater than a maximum width of the lure body.

According to still another embodiment, a fishing lure includes a lure body, an anchor point, a hook, and a guide. The lure body has opposed forward and rearward areas, an upper area, and a lower area. The anchor point extends upwardly from the upper area of the lure body in a direction away from the rearward area of the lure body. The hook has a shank fixedly extending from the rearward area of the lure body, and the hook has a point located above the lure body. The guide extends from the forward area of the lure body. The guide has a steering portion angled downwardly away from the anchor point, and the steering portion extends downwardly below the lure body. The steering portion of the guide includes a leading edge and is generally symmetrical, and a maximum width of the guide is greater than a maximum width of the lure body.

DETAILED DESCRIPTION

Figure 1:
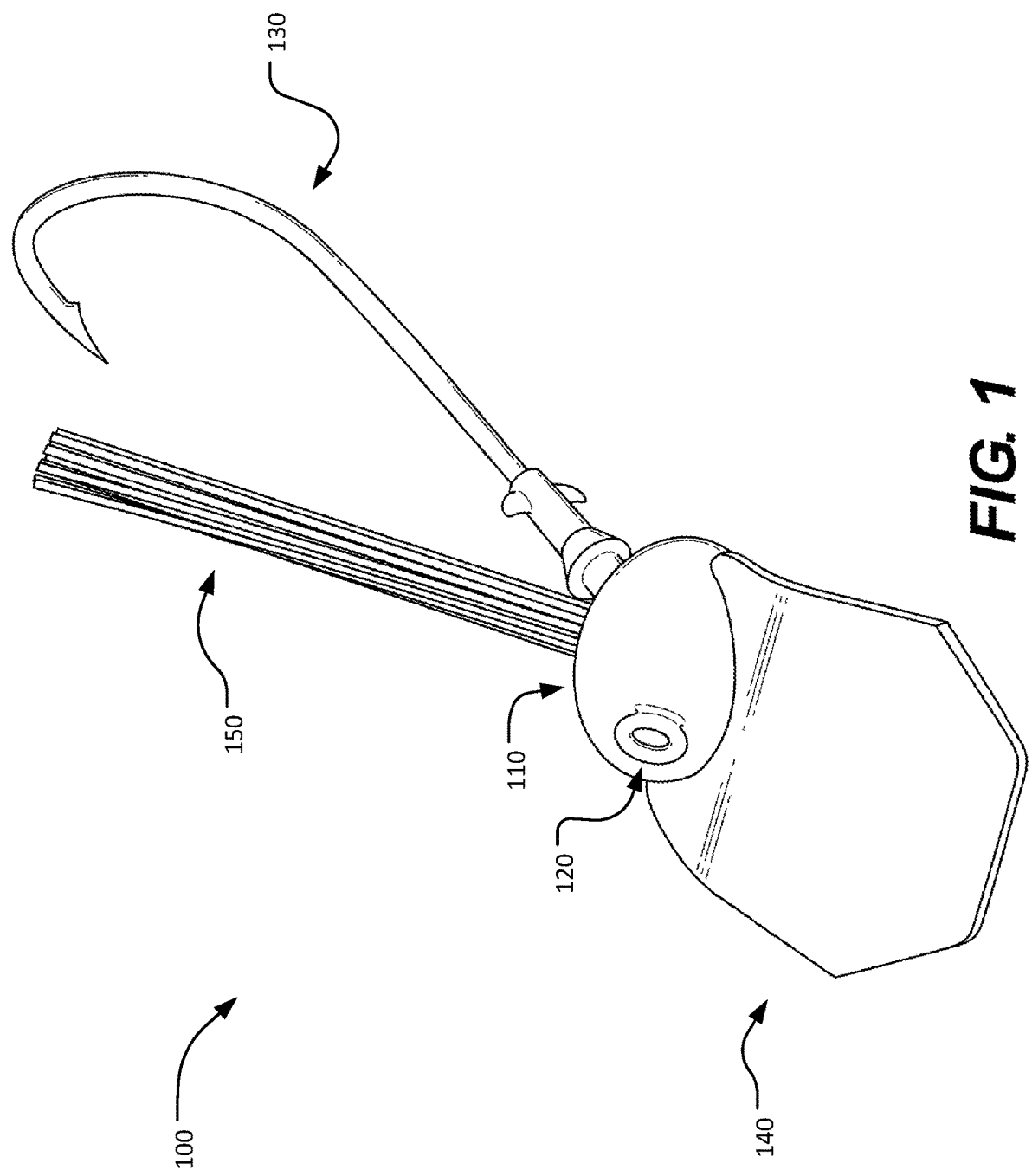
FIG. 1 is a perspective view of a fishing lure according to an embodiment of the current disclosure.

Many types of fish feed exclusively or at least partially from the bottom of a body of water, such as a lake or river. For simplification, the term "lake" is used herein to refer to any body of water relevant to the disclosed lure (e.g., lakes, rivers, ponds, streams, etcetera). Even though they may also feed from different layers of water, these fish are often referred to as bottom feeders and include such freshwater fish as bass, carp, and catfish. Bass may particularly prefer to feed on crayfish at the floor of the lake.

When fishing for bottom feeders, either live bait or a lure may be used. Live bait often has a relatively short lifespan or is dead before being baited on a hook. And both live bait and lures tend to rise from the lake floor and not mimic movement of crayfish or other such natural food sources for bottom feeders. To try to address the tendency to rise, weights are often used along with live bait and lures. In addition, both live bait and lures frequently get caught on the various debris and organisms on the lake floor.

The current disclosure provides lures which may behave similar to crayfish or other such natural food sources for bottom feeders, which may become entangled less frequently than conventional bait, and/or which may require less weight than conventional bait to overcome the tendency to rise.

FIGS. 1 through 6 illustrate a fishing lure for fishing on the floor of a lake, according to an embodiment 100 of the current disclosure. The fishing lure 100 has a lure body 110, an anchor point 120, a hook 130, and a guide 140. First and second perpendicular orientation planes (or "imaginary planes") 1 and 2 are provided in the figures for reference.

The lure body 110 has opposed forward and rearward areas 111, 112, an upper area 113 that terminates at a top 114, and a lower area 115 that terminates at a bottom 116. The lure body 110 may be shaped in numerous ways to resemble prey or otherwise attract fish, though it may be particularly desirable for the lure body 110 to be generally symmetrical about the second orientation plane 2. The lure body 110 extends along the first orientation plane 1 and separates the upper area 113 of the lure body 110 from the lower area 115 of the lure body 110, and in some embodiments the lure body 110 may additionally be generally symmetrical about the first orientation plane 1. The lure body 110 may be constructed of any appropriate material or combination of materials, whether now known or later developed, such as metal, plastic, composite, and rubber.

The anchor point 120 extends upwardly from the upper area 113 of the lure body 110 in a direction away from the rearward area 112 of the lure body 110 for attaching fishing line to the lure body along the second orientation plane 2. As shown in the drawings, the anchor point 120 may extend along the second orientation plane 2 and may be an eyelet having a hole 122 with a center axis that extends generally perpendicularly to the second orientation plane 2. In some embodiments, the anchor point 120 is formed with or otherwise inseparable from the lure body 110; but in other embodiments, the anchor point 120 may be threaded into or otherwise selectively removable from the lure body 110.

The hook 130 extends from the rearward area 112 of the lure body 110. As shown in the figures, the hook 130 may have a shank 132 fixedly extending from the rearward area 112, a bend 134 extending away from the bottom 116 of the lure body 110, and a point (or "tip") 136 located above the lure body 110 and generally aligned with the anchor point 120. The first and second orientation planes 1 and 2 are shown extending along the shank 132 in the embodiment 100. While a hook 130 having a straight shank 132 and a single tip 136 is shown, other embodiments may include an offset shank 132 and/or multiple tips 136 (e.g., the hook 130 may be a treble hook). Those skilled in the art will appreciate that there are many types of hooks 130 that may be used with the current disclosure, including hooks that currently exist and hooks that will be made in the future.

The guide 140 extends from the forward area 111 of the lure body 110 away from the hook 130 and has a steering portion 142 and an attachment portion 149. The steering portion 142 is angled relative to the attachment portion 149 in a direction away from the anchor point 120 and extends beyond the lower area 115 of the lure body 110. It may be particularly desirable for the steering portion 142 to be angled between 135° and 150° relative to the first orientation plane 1, and even more desirable for the steering portion 142 to be angled between 145° and 150° relative to the first orientation plane 1. The steering portion 142 includes a leading edge 143, and both the steering portion 142 and the attachment portion 149 may be generally symmetrical as shown in the figures (e.g., about the second orientation plane 2).

In the embodiment 100, the leading edge 143 is generally linear and the steering portion 142 is generally planar. A first tapered edge 144a extends from one end of the leading edge 143 to a first lateral edge 145a at a first point 146a, and a second tapered edge 144b extends from another end of the leading edge 143 to a second lateral edge 145b at a second point 146b, such that a leading zone 147a (FIG. 4) extending from the leading edge 143 to an imaginary line 148 connecting the first and second points 146a, 146b is generally trapezoidal. The first lateral edge 145a and the second lateral edge 145b each extend to the attachment portion 149 of the guide 140, and the maximum width of the guide 140 is a distance W1 (FIG. 6) between the first and second points 146a, 146b such that a trailing zone 147b (FIG. 4) extending from the imaginary line 148 to the attachment portion 149 is generally trapezoidal and the distance W1 is greater than a maximum width of the lure body 110.

Figure 5:
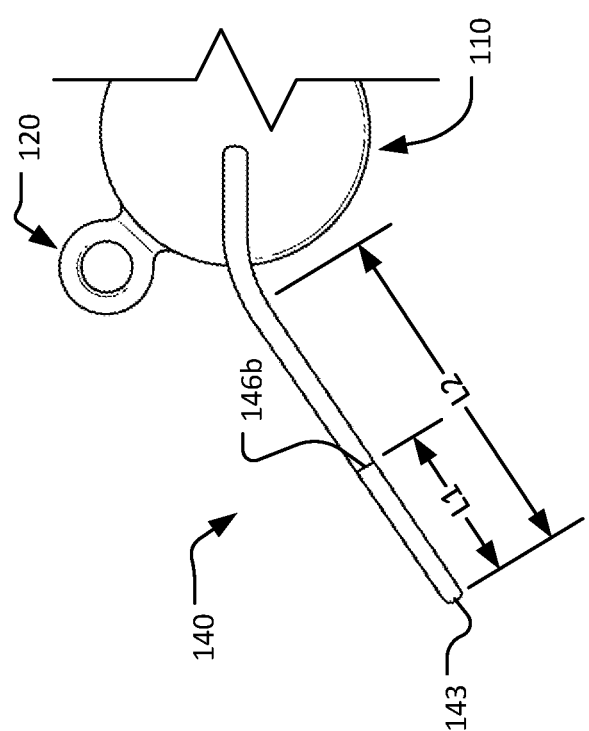
FIG. 5 is a partial side view taken along A-A in FIG. 2.
Figure 6:
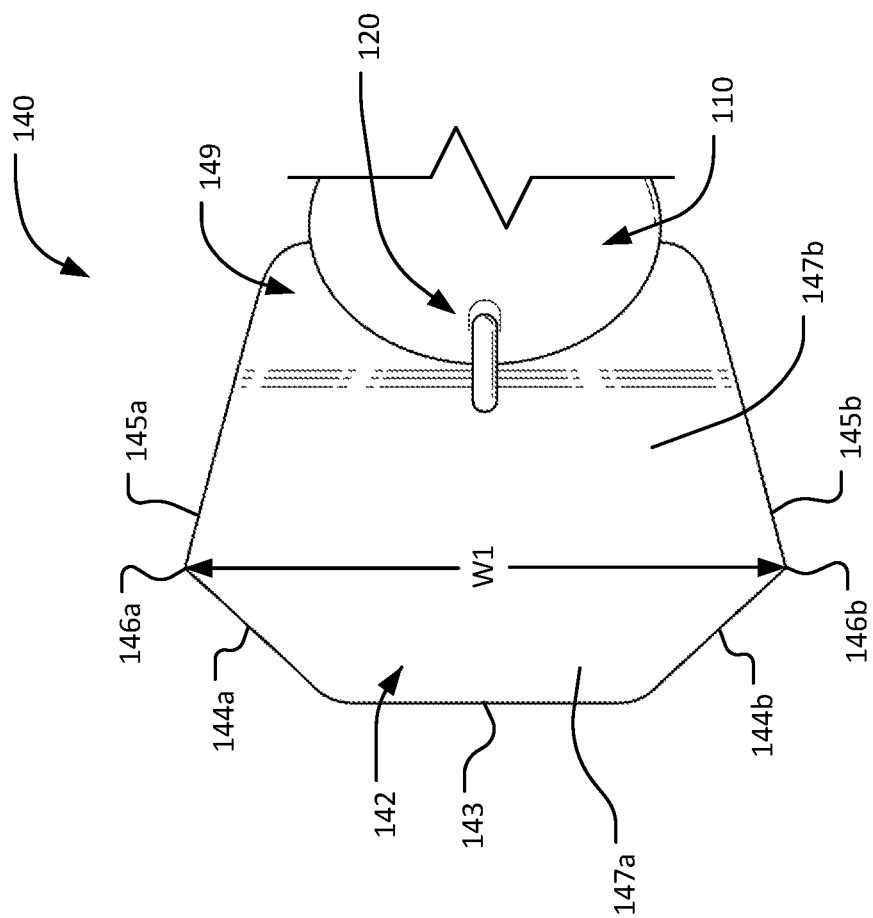
FIG. 6 is a partial top view taken along A-A in FIG. 2.

It may be particularly desirable for the first tapered edge 144a to be angled between 120° and 150° relative to the leading edge 143, and even more desirable for the first tapered edge 144a to be angled between 135° and 140° relative to the leading edge 143. And, or alternately, it may be particularly desirable for a length L1 of the leading zone 147a to be 25% to 60% of an overall length L2 of the leading zone 147a and the trailing zone 147b, and even more desirable for the length L1 to be 42% to 49% of the overall length L2 as shown in FIG. 5.

Figure 2:
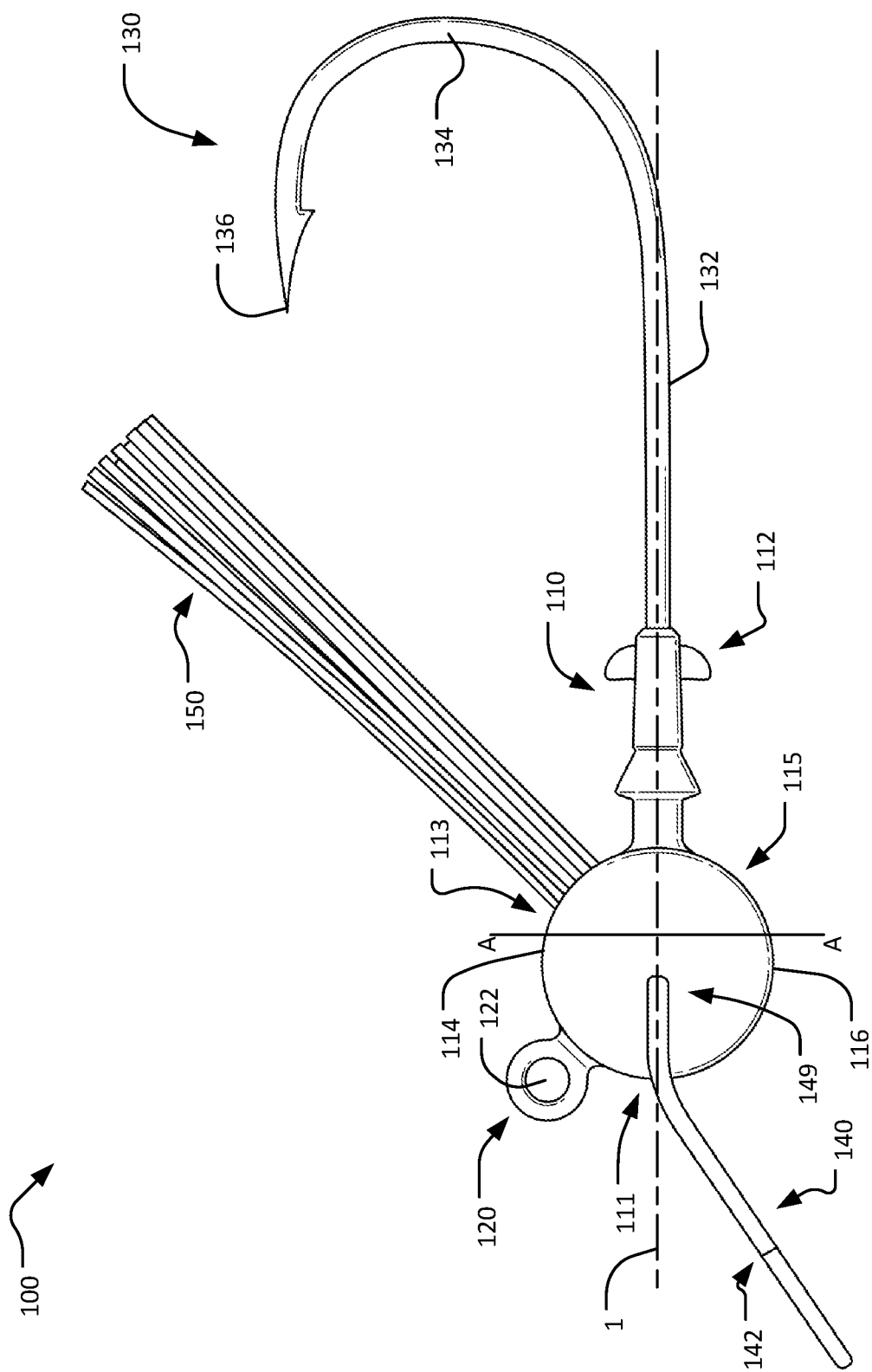
FIG. 2 is a side view of the fishing lure of FIG. 1, and the opposite side view is generally a mirror image of FIG. 2.

The attachment portion 149 couples the steering portion 142 to the lure body 110 and may desirably extend along the first orientation plane 1 as shown in the embodiment 100 in FIG. 2. But in other embodiments, the attachment portion 149 may be coupled to the upper area 113 or the lower area 115 of the lure body 110 and may or may not extend parallel to the first orientation plane 1.

Figure 3:
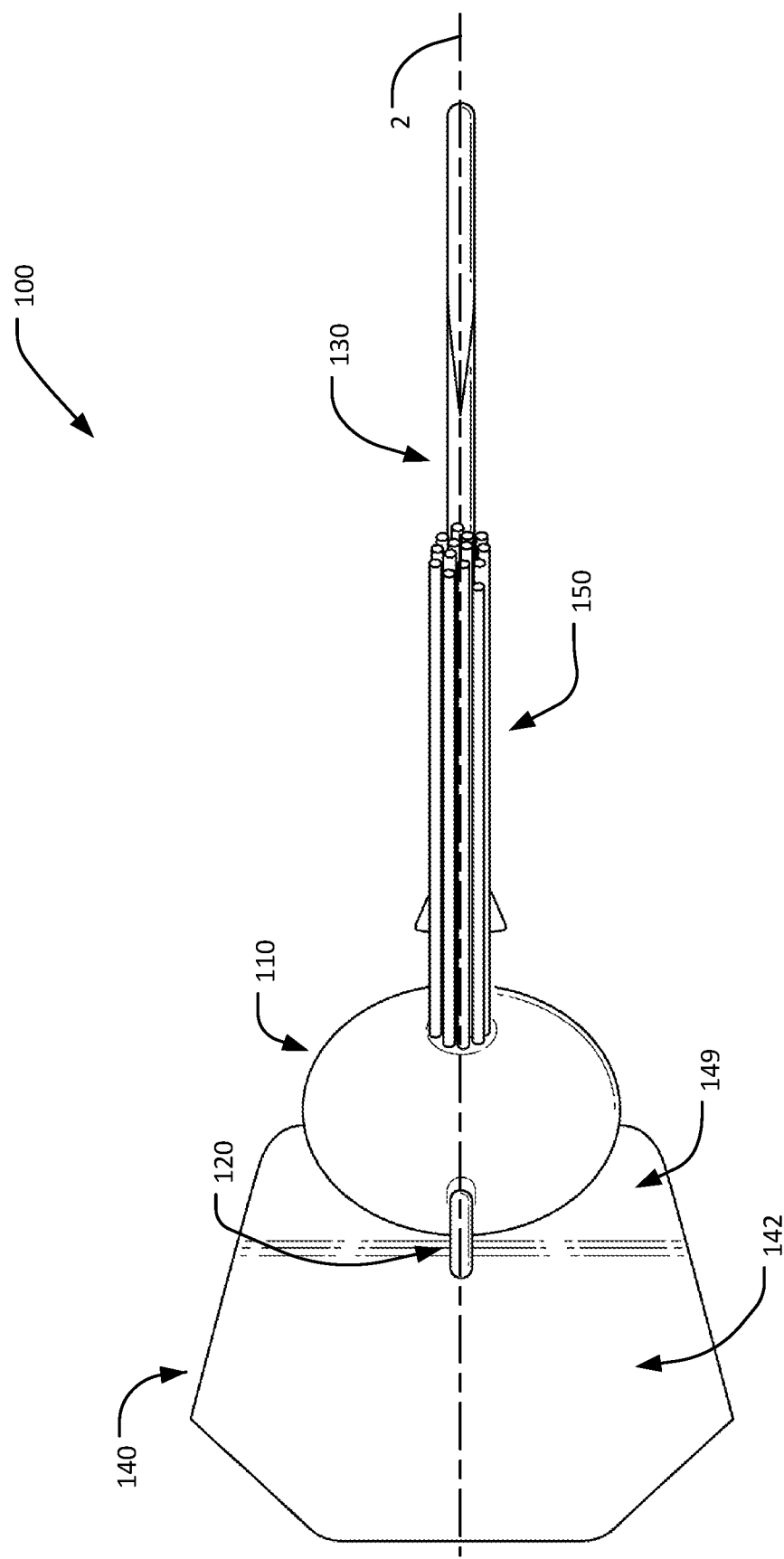
FIG. 3 is a top view of the fishing lure of FIG. 1.
Figure 4:
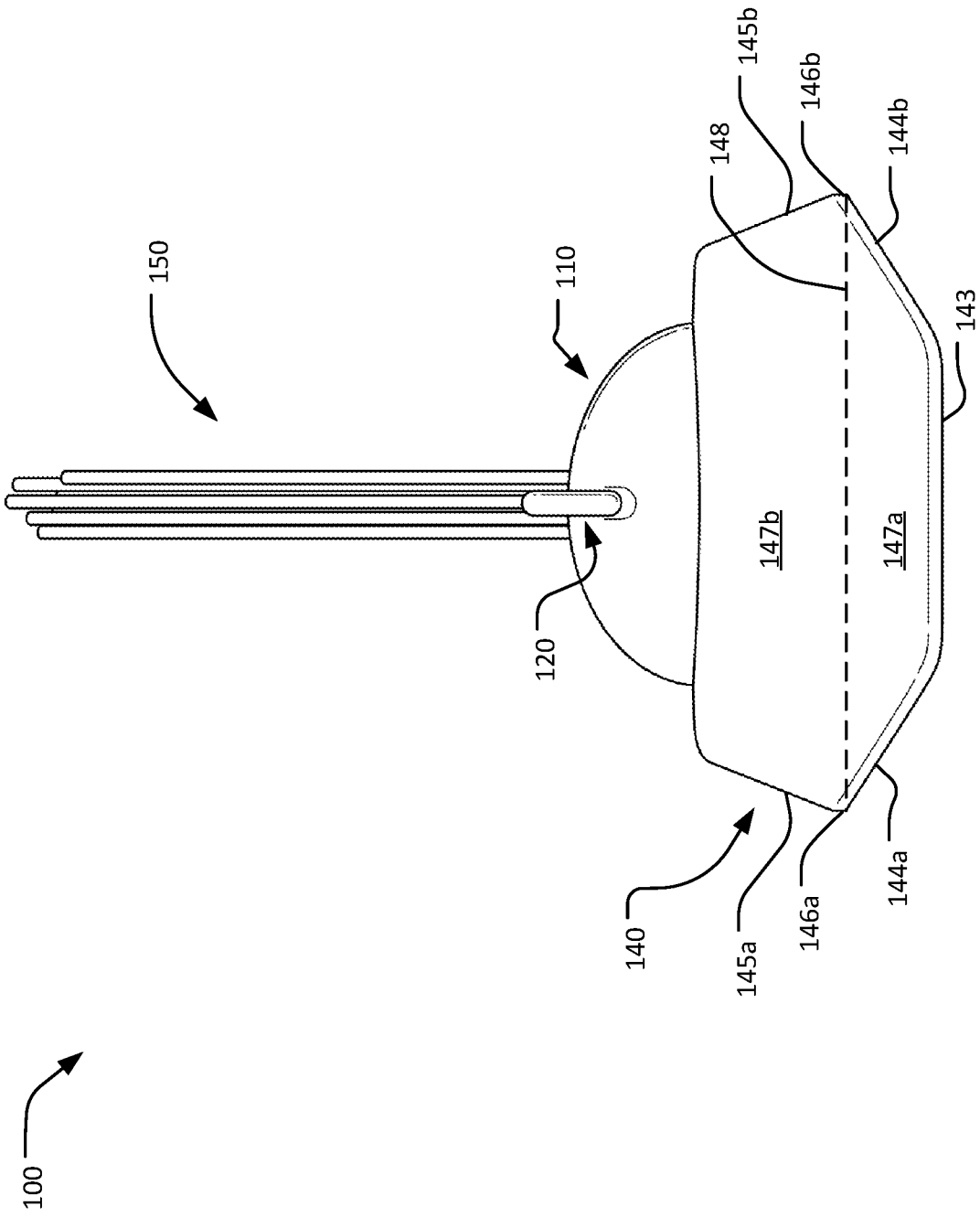
FIG. 4 is a front view of the fishing lure of FIG. 1.

As shown throughout the drawings, an attractant 150 may extend from the upper area 113 of the lure body 110 in a direction away from the lower area 115 and away from the forward area 111 of the lure body 110, with the attractant 150 being between the anchor point 120 and the tip 136 of the hook 130. As shown in FIG. 3, the attractant may desirably be aligned with the anchor point 120 for balance and/or to disguise the hook 130.

In use, a fishing line is strung on the anchor point 120 and the fishing lure 100 is cast into a lake and settles onto the lake floor. If desired, a sinker may be operably coupled to the lure body 110 to cause the fishing lure 100 to sink faster and remain on the lake floor. However, due to the construction of the lure 100, the sinker may be lighter than would otherwise be required for conventional sinkers in order to remain on the lake floor. Using the fishing line, the fishing lure 100 is then pulled across the lake floor.

Due to the guide 140, the lure 100 stays on the lake floor even as the fishing line is being reeled in. And further, the guide 140 may cause the lure 100 to move across the lake floor in a manner that resembles a crayfish or other prey of bass or other bottom feeders while keeping the hook 130 free from snagging debris and organisms on the lake floor. The particular configuration and contours of the guide 140 may be varied to cause different desired motions and attract different prey.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations and are contemplated within the scope of the claims.

The invention claimed is:

1. A fishing lure, comprising:
   a lure body having opposed forward and rearward areas, an upper area that terminates at a top, and a lower area that terminates at a bottom;
   a hook having a shank fixedly extending from the rearward area of the lure body, a bend extending away from the bottom of the lure body, and a tip; a first orientation plane extending along the shank and the lure body; the first orientation plane separating the upper area of the lure body from the lower area of the lure body; a second orientation plane perpendicular to the first orientation plane extending along the shank and the lure body;

an anchor point extending from the upper area of the lure body in a direction away from the first orientation plane and away from the rearward area of the lure body for attaching fishing line to the lure body along the second orientation plane; and a guide consisting of a steering portion and an attachment portion, the steering portion being angled relative to the attachment portion in a direction away from the anchor point, the attachment portion being planar and coupling the steering portion to the lure body such that the steering portion extends away from the hook and away from the top of the lure body, the steering portion extending beyond the bottom of the lure body relative to the first orientation plane;

wherein the steering portion of the guide is planar and has a leading edge and first and second lateral edges symmetrical to one another about the second orientation plane;

wherein the lure is configured to sink naturally and rest upon a bottom surface of a body of water, and the steering portion is configured to keep the lure engaged on the bottom surface as the lure is pulled, such that the lure drags across the bottom surface while elevating the hook and inhibiting snagging; and wherein the steering portion is further configured to alter movement of the lure such that the lure mimics the movement of a crawfish while dragging along the bottom surface.

2. The fishing lure of claim 1, further comprising an attractant extending from the upper area of the lure body in a direction away from the first orientation plane and away from the forward area of the lure body, the attractant being between the anchor point and the tip of the hook.

3. The fishing lure of claim 1, wherein the attachment portion of the guide extends in the first orientation plane.

4. The fishing lure of claim 1, wherein the attachment portion of the guide is coupled to the upper area of the lure body.

5. The fishing lure of claim 1, wherein the attachment portion of the guide is coupled to the lower area of the lure body.

6. The fishing lure of claim 1, wherein:

the first and second lateral edges extend from the attachment portion of the guide;

the steering portion of the guide has a first tapered edge extending from the first lateral edge at a first point to the leading edge; and the steering portion of the guide has a second tapered edge extending from the second lateral edge at a second point to the leading edge; and a maximum width of the guide is a distance between the first and second points.

7. The fishing lure of claim 6, wherein the first tapered edge is angled between 120° and 150° relative to the leading edge.

8. The fishing lure of claim 6, wherein:

a leading zone of the guide extends from the leading edge to an imaginary line connecting the first and second points;

a trailing zone of the guide extends from the imaginary line connecting the first and second points to the attachment portion; and a length of the leading zone is 25% to 60% of an overall length of the leading zone and the trailing zone.

9. The fishing lure of claim 8, wherein the steering portion is angled between 135° and 150° relative to the first orientation plane.

10. The fishing lure of claim 1, wherein a maximum width of the steering portion is greater than a maximum width of the lure body.

11. The fishing lure of claim 1, wherein the anchor point is an eyelet having a hole with a center axis that extends perpendicularly to the second orientation plane.

12. A fishing lure, comprising:

a lure body having opposed forward and rearward areas, an upper area, and a lower area;

an eyelet for connecting a fishing line extending upwardly from the upper area of the lure body in a direction away from the rearward area of the lure body;

a hook extending from the rearward area of the lure body, the hook having a tip located above the lure body and aligned with the eyelet; and a symmetrical guide extending from the forward area of the lure body, the guide having a steering portion angled downwardly away from the eyelet, the steering portion extending downwardly beyond the lower area of the lure body;

wherein the steering portion of the guide comprises:

a first lateral edge extending away from the lure body to a first point;

a second lateral edge extending away from the lure body to a second point;

a leading edge;

a first tapered edge extending from the first point to the leading edge; and a second tapered edge extending from the second point to the leading edge;

wherein a leading zone of the guide extends from the leading edge to an imaginary line connecting the first and second points, the leading zone being trapezoidal;

wherein a maximum width of the guide is a distance between the first and second points;

wherein the maximum width of the guide is greater than a maximum width of the lure body;

wherein the lure is configured to sink naturally and rest upon a bottom surface of a body of water, and the steering portion is configured to keep the lure engaged on the bottom surface as the lure is pulled, such that the lure drags across the bottom surface while elevating the hook and inhibiting snagging; and wherein the steering portion is further configured to alter movement of the lure such that the lure mimics the movement of a crawfish while dragging along the bottom surface.

13. The fishing lure of claim 12, further comprising an attractant extending from the upper area of the lure body in a direction away from the forward and lower areas of the lure body, the attractant being between the eyelet and the tip of the hook, the attractant being aligned with the eyelet and the tip of the hook.

14. A fishing lure, comprising:

a lure body having opposed forward and rearward areas, an upper area, and a lower area;

an anchor point extending upwardly from the upper area of the lure body in a direction away from the rearward area of the lure body;

a hook having a shank fixedly extending from the rearward area of the lure body, the hook having a tip located above the lure body; and a guide extending from the forward area of the lure body, the guide having a steering portion angled downwardly away from the anchor point, the steering portion extending downwardly below the lure body;

wherein the steering portion of the guide includes a leading edge and is symmetrical;

wherein a maximum width of the guide is greater than a maximum width of the lure body;

wherein the lure is configured to sink naturally and rest upon a bottom surface of a body of water, and the steering portion is configured to keep the lure engaged on the bottom surface as the lure is pulled, such that the lure drags across the bottom surface while elevating the hook thereby and inhibiting snagging; and wherein the steering portion is further configured to alter movement of the lure such that the lure mimics the movement of a crawfish while dragging along the bottom surface;

wherein: the leading edge is linear; and the steering portion of the guide has a trapezoidal leading zone extending from the leading edge.

15. The fishing lure of claim 14, further comprising an attractant extending from the upper area of the lure body in a direction away from the forward and lower areas of the lure body, the attractant being rearward of the anchor point.

16. The fishing lure of claim 1, wherein the first lateral edge is linear and the second lateral edge is linear.

17. The fishing lure of claim 12, wherein the first lateral edge is linear and the second lateral edge is linear.

18. The fishing lure of claim 1, wherein the steering portion is further configured to keep the lure engaged on the bottom surface of the body of water without weighted sinkers, or with weighted sinkers of lower weight than traditionally required.

19. The fishing lure of claim 1, wherein the steering portion is configured to alter movement of the lure such that the lure mimics other varieties of prey for bottom feeding fish, while dragging along the bottom surface.

\* \* \* \* \*